(12) United States Patent
Chyall et al.

(10) Patent No.: US 6,632,442 B1
(45) Date of Patent: Oct. 14, 2003

(54) INTUMESCENT POLYMER COMPOSITIONS

(75) Inventors: Leonard J. Chyall, Lafayette, IN (US); Harry A. Hodgen, Battle Ground, IN (US); Frederick J. Vyverberg, Lafayette, IN (US); Robert W. Chapman, Delphi, IN (US); Phillip K. Chou, Pewaukee, WI (US)

(73) Assignee: PABU Services, Inc., Wilmington, DE (US)

( * ) Notice: Subject to any disclaimer, the term of this patent is extended or adjusted under 35 U.S.C. 154(b) by 0 days.

(21) Appl. No.: 09/632,715

(22) Filed: Aug. 4, 2000

Related U.S. Application Data

(60) Provisional application No. 60/147,740, filed on Aug. 6, 1999, and provisional application No. 60/147,741, filed on Aug. 6, 1999.

(51) Int. Cl.$^7$ .............................. A61K 33/08; C08F 4/10; C08K 5/527; C08K 3/20
(52) U.S. Cl. ................ 424/400; 524/445; 524/582; 524/100; 524/145; 524/403
(58) Field of Search ................... 524/145, 445, 524/100, 582, 403; 424/400

(56) References Cited

U.S. PATENT DOCUMENTS

| | | | |
|---|---|---|---|
| 3,293,327 A | | 12/1966 | Heckenbleikner et al. .. 260/936 |
| 3,633,675 A | * | 1/1972 | Biederman, Jr. |
| 4,341,694 A | | 7/1982 | Halpern ...................... 252/606 |
| 4,454,064 A | | 6/1984 | Halpern et al. ............. 260/974 |
| 4,992,481 A | * | 2/1991 | von Bonin et al. |
| 5,204,393 A | | 4/1993 | Nalepa et al. ............... 524/101 |
| 5,237,085 A | | 8/1993 | Telschow et al. ............ 558/74 |
| 5,973,041 A | | 10/1999 | Campbell et al. ........... 524/117 |
| 6,228,912 B1 | * | 5/2001 | Campbell et al. |

FOREIGN PATENT DOCUMENTS

| | | | |
|---|---|---|---|
| EP | 0 069 500 A1 | 1/1983 | ............ C08K/5/00 |
| WO | WO 95/10565 | 4/1995 | ......... C08K/5/3492 |
| WO | WO 97/41173 | 11/1997 | ............ C08K/5/521 |
| WO | WO 99/43747 | 9/1999 | ............ C08K/5/523 |
| WO | WO 00/12614 | 3/2000 | ......... C08K/5/5399 |

OTHER PUBLICATIONS

U.S. patent application Ser. No. 09/235,680, Campbell et al., filed Jan. 22, 1999.
Notification of Transmittal of the International Preliminary Examination Report (Form PCT/IPEA/416) and International Preliminary Examination Report (Form PCT/IPEA/409) dated 03.07.2001.
Patent Abstracts of Japan, vol. 1999, No. 13, Nov. 30, 1999 & JP 11 228748 A (Sekisui Chem Co Ltd), Aug. 24, 1999.
Halpern et al.: "Fire Retardancy of Thermoplastic Materials by Intumescence", Ind. Eng. Chem Prod. Res. Dev., vol. 23, No. 2, 1984, p. 233–238, XP000960807, American Chemical Society, Washington.
Intumescent Fire Retardants for Plastics–A Continuance, D.J. Scharf, pp. 159–163 (undated).
Some Aspects of Synergism and Catalysis in FR of Polymeric Materials –An Overview, M. Lewin et al, 9th Annual BCC Conference on Flame Retardance, BUsiness Communications Co.,Inc.,Norwalk, CT,pp. 23–37.
Studies on Flame Retardant Intumescent Char: Part I, Fire Safety Journal 19, D. Scharf et al., pp. 103–117, Elsevier (Ireland, 1992).
Mn and Zn Compounds as Catalysts of Intumescent Flame Retardance of Polypropylene, M. Lewin et al., May, 2000, BCC Conference, pp. 1B–17B.
Clay Colloid Chemistry, H. Van Olphen, Ed., Ch. t, pp. 57–77.

\* cited by examiner

*Primary Examiner*—Edward J. Webman
(74) *Attorney, Agent, or Firm*—Michael W. Ferrell

(57) ABSTRACT

An intumescent polymer composition includes a matrix polymer, an acid catalyst source, a nitrogen source and an ionic phyllosilicate synergist having substantial cationic exchange capacity. Particularly preferred ionic phyllosilicates are montmorillonoids whereas pentaerythritol phosphate is a preferred acid catalyst source:

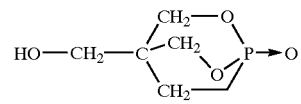

23 Claims, No Drawings

INTUMESCENT POLYMER COMPOSITIONS

This non-provisional patent application includes material from the following provisional patent applications, the priority of which is hereby claimed pursuant to 37 CFR 1.78:

| Ser. No. | Filing Date | Title | Inventor(s) |
|---|---|---|---|
| 60/147,740 | Aug. 6, 1999 | Organic Clay Synergists for Flame Retardant Polymer Additives | Leonard J. Chyall Harry A. Hodgen |
| 60/147,741 | Aug. 6, 1999 | Inorganic Clay Synergists for Polymer Additives | Leonard J. Chyall Harry A. Hodgen |

TECHNICAL FIELD

The present invention relates generally to intumescent flame retardant polymers and more specifically to intumescent compositions including a matrix polymer, an intumescent composition including an acid catalyst component, a nitrogen source and an ionic phyllosilicate synergist.

BACKGROUND

Flame retardant polymer compositions are well-known in the art. Because of potential environmental and toxicity concerns, there is increasing interest in antimony and halogen-free systems which provide the desired flame retardant properties to a polymeric article. Phosphorous-based compositions are shown, for example, in Publication Nos. WO 99/43747 and WO 97/41173.

The '747 publication entitled *Flame Retardant Polymer Blends* discloses an antimony-free combination of a phosphate-based flame retardant, especially an aryl diphosphate, and an organoclay which are reported to afford synergistic flame retardant properties to polymer blends, especially polyphenylene ether-polystyrene blends and blends of polycarbonates with styrene copolymers such as ABS copolymers. The polyphenylene ether-polystyrene blends free from fluorocarbon additives are preferred according to the disclosure.

The '173 publication entitled *Flame Retardant Composition for Polymers* claims a flame retardant composition, adapted to be mixed with a polymer substrate to confer flame retardancy on the substrate, which comprises: (a) a bicyclic phosphorus flame retardant compound, such as one containing one or more pentaerythritol phosphate alcohol moieties, as exemplified by bis(pentaerythritol) phosphate alcohol carbonate; (b) an intumescent flame retardant compound containing nitrogen and phosphorus, such as melamine phosphate; and (c) a monophosphate ester compound to enhance the charring and processing characteristics of the composition in the polymer substrate, such as a liquid aryl group containing phosphate ester compound. The monophosphate ester compound is typically triphenyl phosphate.

See, also, U.S. Pat. No. 4,454,064 to Halpern et al. which discloses a method for the preparation of pentaerythritol phosphate by mixing pentaerythritol and phosphorous oxychloride in a solvent and heating to a temperature of 75 to 125° C., as well as U.S. Pat. No. 5,237,085 to Telschaw et al. which teaches synthesis of pentaerythritol-based phosphorous heterocycles by reaction of a pentaerythritol polyol with either a trivalent or pentavalent compound using an aryl phosphate solvent at an elevated temperature. A variety of bicyclic phosphate compounds are likewise disclosed in U.S. Pat. No. 3,293,327 to Hechenbleikner et al.

Intumescent flame retardant compositions including 2,6,7-trioxa-1-phosphobicyclo[2.2.2.]octane-4-methanol-1-oxide and a nitrogen compound selected from the group melamine, ammeline, benzoguanidine, guanidine, urea and salts thereof, are reported to be intumescent and readily adapted to flame retard a variety of dissimilar resins including polyolefins, polyvinylaromatic resins, polycarbonates, polyacrylates, polyamides, PVC and blends thereof in U.S. Pat. No. 4,341,694 to Halpern.

U.S. Pat. No. 5,204,393 to Nalepa et al. describes a flame retardant intumescent polyolefin which comprises a combination of ammonium polyphosphate, tris(2-hydroxyethyl) isocyanurate; melamine cyanurate; and a selected silica in an amount from 0.5 percent to an amount equal to one-half the amount by weight of tris(2-hydroxyethyl) isocyanurate.

Intumescent polymer systems generally are believed to function by way of (1) a carbonific or char-forming component which can be the polymer itself, (2) an acid generating component which acts as a catalyst and (3) a spumific or blowing agent, typically a nitrogen source of both ammonia and $N_2$. The greater the char volume, the better the insulating, whereas the inner cross-sectional core should be cellular and close celled. In addition, the surface crust should be thick, continuous and impenetrable. See Scharf, D. J., *Intumescent Fire Retardants for Plastics—A Continuance* (undated). The catalyst or acid generating component is frequently a phosphorous derivative, the function of which is to catalyze dehydration. See Lewin, M., *Some Aspects of Synergism and Catalysis in FR of Polymeric Materials—An Overview*, Ninth Annual BCC Conference on Flame Retardancy, Business Communications Co., Inc. Norwalk Conn., wherein ammonium polyphosphate is described as the acid generating component and nitrogen source in a polypropylene system where the polymer itself is the carbonific or char-forming agent.

Perhaps more typically, an organic polyol is used as a carbonific and melamine or a melamine derivative as a spumific. See Scharf, D. et al, *Studies on Flame Retardant Intumescent Char: Part I*, Fire Safety Journal 19, pp. 103–117, Elsevier (Ireland, 1992). In this publication, it is reported that titanium dioxide in suitable amounts exerts a reinforcing or synergistic flame retardant effect, whereas stannous oxide is antagonistic. Likewise, it has been reported that zinc and manganese salts can benefit APP performance. See Lewin et al., $M_n$ and $Z_n$ *Compounds as Catalysts of Intumescent Flame Retardancy of Polypropylene*, May, 2000, BCC Conference.

In any polymer system, it is desirable to limit or minimize expensive additives from a cost perspective. In addition, additives can have adverse effects on processing or properties which, of course, becomes more pronounced as the additive load in the system increases. The commercial success of intumescent polymer systems has clearly been limited by the high loading of acid generating component and spumific required to achieve the desired (typically 94V-O) rating in terms of flame resistance.

SUMMARY OF INVENTION

It has been found in accordance with the present invention that certain ionic phyllosilicates, particularly montmorillonoid layered silicates exert a synergistic effect in intumescent polymer compositions making it possible to lower the amount of additives required for a given level of flame resistance, for instance, to maintain a V-O rating under UL-94 standards utilizing otherwise known acid and nitrogen sources. There is thus provided in accordance with a first aspect of the present invention an intumescent, polymer composition including: a matrix polymer composition; an acid catalyst source; a nitrogen source; and an ionic phyllosilicate in an amount of from about 0.1 to about 2 weight percent of the composition, the ionic phyllosilicate having a cationic exchange capacity of at least about 5 meq per 100 g thereof and being capable of synergizing the intumescence of the composition.

In a particularly preferred class of compositions there is provided an intumescent polypropylene composition including: polypropylene; a cyclic organophosphorous acid catalyst source; a nitrogen source selected from the group consisting of amines, ureas, guanidines, guanamines, s-triazines, amino acids, salts thereof including phosphate, phosphonate, phosphinate, borate, cyanurate and sulfate salts, as well as mixtures of the foregoing; and a montmorillonoid ionic phyllosilicate in which the ionic phyllosilicate is present in an amount of from about 0.1 to about 2 weight percent.

In another aspect of the present invention there is provided a flame retardant additive composition for dispersing in a matrix polymer composition to promote intumescence including: an acid catalyst source; a nitrogen source; an ionic phyllosilicate having a cationic exchange capacity of at least about 5 meq per 100 g thereof; and optionally an organic polyol as a carbonific char-promoting agent, wherein the ionic phyllosilicate is present in an amount of from about 0.5 to about 10 percent by weight of the composition.

DETAILED DESCRIPTION

The invention is described in detail below with reference to numerous exemplary, illustrative and preferred embodiments thereof for purposes of description only. Modification to such embodiments within the spirit and scope of the invention, set forth in the appended claims, will be readily apparent to one of skill in the art. It will further be appreciated that the components of the invention undergo chemical interaction to form other materials, particularly during combustion. Therefore, the invention is directed to the inventive compositions whether or not any chemical interaction has taken place; that is, the invention includes both compositions comprising the recited compositions, as well as reaction products thereof.

The inventive compositions typically include a matrix polymer, an acid source, a carbonific and spumific or nitrogen source component. These components may be in the same chemical compound. For example, ammonium polyphosphate will function as both an acid source and a nitrogen source as will be readily appreciated by one of skill in the art. Likewise, pentaerythritol phosphate alcohol (PEPA) functions as both an acid source and a carbonific. Melamine phosphate can provide carbon for the char, nitrogen for foaming and acid to catalyze dehydration and thus is a particularly preferred ingredient.

In some embodiments, the acid source and nitrogen source are supplied in whole or in part by way of a single chemical compound selected from the group consisting of: ammonium phosphate, ammonium polyphosphate, ammonium pyrophosphate and mixtures thereof.

Intumescent polymer compositions are those that foam and char to provide flame resistance, typically increasing in volume by more than 50 percent, preferably on the order of 100 percent based on the unreacted volume of the composition. The compositions thus typically include an acid catalyst source, a nitrogen source and a carbonific which may be the matrix polymer itself or may be a polyol, or may be provided by way of a multifunctional ingredient such as pentaerythritol phosphate alcohol. The ionic phyllosilicates operate to minimize the amount of additive, be it acid or nitrogen source required to impart a 94V-O rating to the composition. Typically, the ionic phyllosilicate will be operative to reduce the amount of acid, nitrogen and carbonific additives so required by at least about 10% and preferably at least 20% based on the weight of additive.

Acid sources may be borates, sulfates, sulfites, nitrates, phosphates, phosphonates, melamine or other salts of the foregoing, and so forth. Exemplary materials include alkyl diphenyl phosphates; trimethyl phosphate, ($C_3H_9O_4P$); triphenylphosphine oxide, ($C_{18}H_{15}OP$); triphenyl phosphate, ($C_{18}H_{15}O_4P$); ammonium phosphates, such as monoammonium phosphate, ($NH_4H_2PO_4$) and diammonium phosphate, ($NH_4)_2HPO_4$; ammonium polyphosphate ($NH_4PO_3)_n$; amine phosphates, such as melamine phosphates, e.g., melamine orthophosphate ($C_3H_6N_6$ $H_3O_4P$); dimelamine orthophosphate ($2C_3H_6N_6$ $H_3O_4P$); melamine pyrophosphate ($2C_3H_6N_6$ $H_4O_2P_2$), and the like; trialkyl phosphates, such as triethyl phosphate ($C_6H_{15}O_4P$) or trioctyl phosphate, ($C_{24}H_{51}O_4P$); dimethyl methylphosphonate, ($C_3H_9O_3P$); and diethyl ethylphosphonate, ($C_6H_{15}O_3P$); halogenated alkyl phosphates and phosphonates, such as tris(2-chloroethyl) phosphate, ($C_6H_{12}Cl_3O_4P$); tris(1-chloro-2-propyl) phosphate, ($C_9H_{18}Cl_3O_4P$); tris(1,3-dichloro-2 propyl) phosphate, ($C_9H_{15}Cl_6O_4P$); tris[3-bromo-2,2-bis (bromomethyl)propyl] phosphate ($C_{15}H_{24}Br_9O_4P$); and bis (2-chloroethyl)-2-chloroethyl phosphonate; diphosphates, such as 2-chloroethyl diphosphates, e.g., tetrakis(2-chloroethyl); ethylene oxyethylene diphosphate, ($C_{12}H_{24}C_4O_9P_2$); $C_{13}H_{24}Cl_6O_8P_2$ (Albright & Wilson's Antiblaze 100); 2-chloroethyl 2-bromoethyl 3-bromoneopental phosphate, ($C_9H_{18}Br_2ClO_4P$) from Great Lakes Chemical Corporation—Firemaster 836; cyclic phosphonates, such as $C_{15}H_{31}O_9P_3$ (Albright & Wilsons' Antiblaze 19 and 1045); cyclic neopentyl thiophosphoric anhydride; aryl phosphates, such as cresyl diphenyl phosphate, ($C_{19}H_{17}O_4P$); triaryl phosphates, such as triphenyl phosphate, ($C_{18}H_{15}O_4P$); tetraphenyl resorcinol diphosphate, ($C_{38}H_{24}O_8P$); tris(2,4-dibromophenyl) phosphate, ($C_{18}H_9Br_6O_4P$); diphosphine oxides, such as Cyagard RF1204 from American Cyanamid.

Bicyclic organophosphorous compounds useful as an acid catalyst source within the instant invention are pentaerythritol phosphite, trimethylolpropane phosphite, trimethylolethane phosphite, trimethylolbutane phosphite, trimethylol isobutene phosphite, trimethylol pentane phosphite, trimethylolhexane phosphite, trimethylolheptane phosphite, trimethylol octane phosphite, trimethylolnonane phosphite, trimethylolundecane phosphite, trimethylolheptadecane phosphite, pentaerythritol phosphate, pentaerythritol thiophosphate, pentaerythritol selenophosphate, trimethylolpropane phosphate, trimethylolpropane thiophosphate, trimethylol propane selenophosphate, trimethylolethane phosphate, trimethylolethane thiophosphate, trimethylolethane selenophosphate, trimethylolbutane phosphate, trimethylol butane thiophosphate, trimethylolpentane phosphate, trimethylolpentane thiophosphate, trimethylolpentane selenophosphate, trimethylolhexane phosphate, trimethylolhexane thiophosphate, trimethylolheptane phosphate, trimethylolheptane thiophosphate, trimethyloloctane phosphate, trimethyloloctane thiophosphate, trimethylolnonane phosphate, trimethylolnonane thiophosphate, trimethylolnonane selenophosphate, trimethyloldecane phosphate, trimethyloldecane thiophosphate, trimethylolundecane phosphate, trimethylolundecane thiophosphate, trimethylolheptadecane phosphate, trimethylolheptadecane thiophosphate and trimethylolheptadecane selenophosphate.

Particularly preferred is pentaerythritol phosphate alcohol, which is sometimes referred to simply as pentaerythritol phosphate and which has the following general structure:

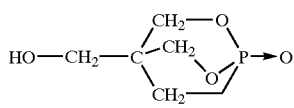

Derivatives of the bicyclic phosphorus compounds may also be used. For example, esters, ethers and carbonates of pentaerythritol phosphate alcohol are known flame retardant components of intumescent systems.

Additional examples of intumescent phosphorus-containing flame retardants include melamine salts of organophosphates such as melamine phenyl phosphate and melamine amyl phosphate.

In accordance with the present invention, a combination of an ionic phyllosilicate, an acid catalyst source, a nitrogen source, and optionally a char-promoting species are processed into a resin to provide a resin composition or product that has improved flame retardant properties and/or lower overall cost. If the flame retardant exhibits sufficient intumescent behavior, then the flame retardant material can be used with the ionic phyllosilicate without the use of a separate char-promoting compound to provide an additive system for flame retardant applications in resins. However, if so desired char-promoting additives can be useful and include polyhydridic alcohols such as pentaerythritol, dipentaerythritol, tripentaerythritol, inositol, adonitol, dulcitol, and 1,3,5-tris(2-hydroxyethyl)cyanuric acid, as well as pentate salts of amino-s-triazines, as disclosed in Fleenor, Jr. U.S. Pat. No. 4,253,972 hereby incorporated by reference. Examples of polymeric char-promoting additives include novolac resins, polyphenylene oxides and polycarbonates. When char-promoting additives are included with the phosphorus-containing flame retardant additive, then should be added in an amount of about 1% to about 10% by weight, based on the weight of the polymer being flame retarded.

Compounds useful as nitrogen sources include any suitable compounds which generate $N_2$ and optionally ammonia such as amines, ureas, guanidines, guanamines, s-triazines, amino acids, and salts thereof including phosphate, phosphonate, phosphinate, borate, cyanurate and sulfate salts. Some specific examples are melamine, urea, benzoguanamine, ammeline, guanidine, cyanoguanidine and glycine; melamine phosphate, melamine pyrophosphate and melamine polyphosphate; ammonium phosphate, ammonium pyrophosphate and ammonium polyphosphate, ethylenediamine phosphate, melamine or ammonium cyanurate and melamine or ammonium borate. Most preferred are melamine phosphate and ammonium polyphosphate.

The characteristics and classification of layered silicates are discussed at length in *An Introduction to Clay Colloid Chemistry*, H. Van Olphen, Ed., Ch. 5, pp. 57–77, the disclosure of which is incorporated herein by reference. In general, clays are phyllosilicates having two-dimensional arrays of silicon-oxygen tetrahedral and two-dimensional arrays of aluminum- or magnesium-oxygen-hydroxyl octahedral. Of particular interest to the present invention are the layered silicates of ionic character, that is, where the silicates are characterized by a substantial cation exchange capacity, at least about 5 milliequivalents (meq) per 100 grams of clay, termed ionic phyllosilicates or layered ionosilicates herein, as opposed to substantially neutral layered silicates such as talc or kaolinites with less than about 5 meq of cation exchange capacity per 100 grams of material. Particularly preferred are such layered silicates wherein the cation exchange capacity of the layered silicate is more than about 25 meq of cation exchange capacity per 100 grams of silicate. Most preferred are those layered silicates of the smectite class, also referred to in the art as montmorillonoid clays which typically have cation exchange capacities of about 70 meq or more per 100 grams of material. Clays useful in accordance with the present invention may have cation exchange capacities of up to about 150 meq per 100 grams of material. Montmorillonoid silicates are further characterized in that they undergo reversible expansion on absorbing water and have a characteristic structure in which water molecules are situated between sheets composed of two layers of silicon atoms sandwiching one nominally of aluminum and/or magnesium, the silicon and aluminum/magnesium being variously replaced by other elements as hereinafter described. It is believed that layered ionic phyllosilicates with low iron content are especially preferred since iron may have an antagonistic effect on intumescent performance of the system. Preferred ionic phyllosilicates are those having less than about 3 percent by weight of iron, with less than about 1 percent by weight being most preferred Especially preferred montmorillonoids for use in connection with the invention include sodium montmorillonite clay and sodium hectorite clay (aluminum and/or magnesium containing silicates) as further discussed herein.

Inorganic cation (alkali metal, for example) or organic-reacted (organophilic) smectite clays, such as montmorillonite clays or any other clay having an aspect ratio of at least 40, preferably at least 50, more preferably at least 75, are generally those employed in connection with the present invention. Examples of suitable clays include phyllosilicates, such as smectite clay minerals, e.g., montmorillonite, particularly sodium montmorillonite; magnesium montmorillonite and/or calcium montmorillonite; nontronite; beidellite; volkonskoite; hectorite; laponite; saponite; sauconite; vermiculite; and the like. Other useful layered materials include illites, such as micaceous minerals and mixed layered illite/smectite minerals, which are optionally made organophilic by reaction or ion-exchange.

Suitable organic cations intercalated via ion-exchange into the interlayer spaces between adjacent layered material platelets may be primary, secondary, tertiary or quaternary onium ions having Formula I or Formula II, as follows:

Formula I

Formula II wherein X=P or N, and wherein Y=S or O; and
wherein $R_1$, $R_2$, $R_3$ and $R_4$, same or different, are H, or organic moieties, such as linear or branched alkyl, aryl or aralkyl moieties having 1 to 24 carbon atoms.

The more preferred onium ions are quaternary ammonium ions having Formula I, wherein $R_1$, $R_2$, $R_3$ and $R_4$ are moieties, same or different, selected from the group consisting of H, alkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation.

Among the preferred silicate layered materials are phyllosilicates of the 2:1 type having a negative charge on the layers ranging from about 0.018 to about 0.36 charges per formula unit and up to about 0.55 charges per formula unit and a commensurate number of exchangeable metal cations in the interlayer spaces. As noted above, most preferred are layered materials are smectite (montmorillonoid) type of clay minerals such as montmorillonite, nontronite, beidellite, volkonskoite, hectorite and saponite. The preferred clay materials generally include interlayer cations such as $Na^+$, $Ca^{+2}$, $K^+$, $Mg^{+2}$, $NH_4+$ and the like, including mixtures thereof.

The amount of organic cation compound which can be used if so desired, such as onium ion or protonated amine, reacted or ion-exchanged with the layered silicate materials, may vary substantially between about 2%, preferably at least about 10%, and about 200%, based on the dry weight of the layered silicate material.

The composition may further include the use of metal oxides or metal salts that further improve the flame retardant efficiency. Suitable metals, for example, include aluminum, titanium, chromium, manganese, iron, cobalt, nickel, copper, zinc, zirconium and tin. Oxides or salts of zinc or manganese, including organic and inorganic salts, are preferred, with zinc borate being most preferred.

The matrix or host polymers that are utilized in accordance with the present invention include thermoplastics and thermosets. Thermosets include suitable polyesters, polyurethanes and epoxies. Thermoplastic matrix polymers include vinyl polymers, such as styrene, styrene copolymers and polyolefins, as well as thermoplastic polyesters and polyurethanes. Polyolefins are made from the polymerization of one or more monomers chosen from the group of ethene, propene, isobutylene, 1-butene, 4-methyl-1-pentene, or alpha-olefins having 5–18 carbon atoms. The polymers may also contain lesser amounts of units derived from copolymerization with monomers such as vinyl acetate and alkyl (meth)acrylate esters like butyl acrylate.

The matrix polymer composition may include fillers, impact modifiers, processing aids and the like, as further hereinafter described.

A large number of siliceous materials may be optionally employed as filler in addition to the other components of the intumescent compositions without changing the basic and novel intumescent character of the compositions imparted by the above-recited ingredients. Suitable filler materials may include diatomite, perlite, pumice, pyrophillite, silica, and talc. These minerals may consist of an alkali metal oxide or alkaline earth element oxide, and silicon dioxide together with a minor amount of water and other elements. Talc, for example, includes from about 25% to about 35% MgO, 35–60% $SiO_2$ and about 5% $H_2O$.

Other fillers such as calcium carbonate may also be employed, as well as reinforcing agents impact modifiers, pigments and the like, as further discussed below.

Fibrous reinforcing agents are commonly: whiskers; glass; mineral wool; calcium sulfate; potassium titanate; boron; alumina; sodium aluminum; hydroxy carbonate; and so forth.

Suitably extruded polymeric compositions may include coloring agents for aesthetic appeal, preferably titanium dioxide, carbon black, and other opacifying agents. The compositions may comprise minor amounts of other additives such as lubricants and antioxidants. These articles of manufacture may be suitably colored with pigments or dyes. Pigments are defined as small insoluble organic or inorganic particles dispersed in the resin medium to promote opacity or translucency. Usual pigments include carbon black, titanium dioxide, zinc oxide, iron oxides, and mixed metal oxides. Dyes are organic and soluble in the plastic, and may be used alone or in combination with pigments to brighten up pigment based colors. All such colorants may be used in a variety of modes which include dry color, conventional color concentrates, liquid color and precolored resin.

The polymeric composition of this invention may further contain one or more agents to improve the impact strength. So-called core-shell polymers built up from a rubber-like core on which one or more shells have been grafted may be used. The core usually consists substantially of an acrylate rubber or a butadiene rubber. One or more shells have been grafted on the core. Usually these shells are built up for the greater part from a vinylaromatic compound and/or a vinylcyanide and/or an alkyl(meth)acrylate and/or (meth)acrylic acid. The core and/or the shell(s) often comprise multifunctional compounds which may act as a cross-linking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388, incorporated by reference herein.

Various rubber polymers and copolymers can also be employed as impact modifiers. Examples of such rubbery polymers are polybutadiene, polyisoprene, and various other polymers or copolymers having a rubbery dienic monomer.

Styrene-containing polymers can also be used as impact modifiers. Examples of such polymers are acrylonitrile-butadiene-styrene, styrene-acrylonitrile, acrylonitrile-butadiene-alpha-methylstyrene, styrene-butadiene, styrene butadiene styrene, diethylene butadiene styrene, methacrylate-butadiene-styrene, high rubber graft ABS, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers in some embodiments.

The present invention is specifically directed to flame retardant compositions as rated, for example, by the UL-94 standard.

The UL-94 standard for tests for flammability of plastic materials for parts in devices and appliances involve several subtests, but the tests of primary interest are small which rate materials 94V-0, 94V-1 or 94V-2. This is a small scale vertical burn test in which a bar of the material to be tested is suspended vertically above a small flame for 10 seconds. The flame is removed and any continued burning time is measured. As soon as the afterflame extinguishes, the ignition source is applied for a second 10 second period, removed, and any residual afterflame or afterglow time is measured. The test is run on 5 specimens to get aggregate as well as individual results. Each bar is 125 mm long×13 mm wide×minimum and maximum thickness determined by the end use. Typical thickness are 1/8", 1/16" and 1/32" where it is generally more difficult to obtain the highest rating with thinner bars.

Criteria for meeting the various ratings is shown in the following table.

TABLE 1

Flammability Ratings

| | 94V-0 Rating | 94V-1 Rating | 94V-2 Rating |
|---|---|---|---|
| Afterflame time for each individual specimen after either ignition | ≦10 sec. | ≦30 sec. | <30 sec. |
| Total afterflame time (both ignitions) for all 5 specimens | ≦50 sec. | ≦250 sec. | <250 sec. |
| Afterflame plus afterglow time for each individual specimen after the second ignition | ≦30 sec. | ≦60 sec. | <60 sec. |
| Any specimen burned to the holding clamp? | No | No | No |
| Cotton was ignited by flaming drips at any time for the 5 bars? | No | No | Yes |

In the following examples, various compositions have been prepared by melt-formulating the various components recited below using an extruder with a barrel temperature of about 400° F. followed by injection molding into UL test plaques in a mold at a temperature of about 120° F. The plaques were then rated for flammability as noted above.

EXAMPLES 1 to 18

The following examples demonstrate how the flame retardant performance of a mixture of pentaerythritol phosphate alcohol (PEPA) and melamine phosphate in a 2:3 weight ratio, respectively, can be improved in polypropylene with montmorillonite clay materials. A minimum of 21% of the PEPA:melamine phosphate mixture is needed to obtain a 94V-0 rating in Himont 6524 polypropylene (MFI=6). A formulation of 20% of the PEPA:melamine phosphate mixture and 1% Cloisite 15A (organoclay, Southern Clay Products) also has 94V-0 rating. This indicates that the flame retardant component can be substituted with low levels of clay without sacrificing UL-94 performance. At a 0.8% loading of Cloisite 15A only 19% of the PEPA:melamine phosphate mixture was required to obtain a 94V-O rating, while formulations slightly lower or higher in clay content did not provide a 94V-O rating (Table 2). This demonstrates the necessity of using the clay additive within a well-defined range of loading levels.

The use of a proprietary experimental organoclay also provides a system with flame retardant properties similar to the system described above. In this case, the load level of the 2:3 weight ratio mixture of PEPA:melamine phosphate can be reduced even further without sacrificing the flammability performance as measured by the UL-94 test method (Table 3).

Table 4 demonstrates that sodium montmorillonite provides improved flame retardant performance in the polypropylene system whereas talc, glass, $TiO_2$ and kaolin do not synergistically interact with the catalyst and nitrogen sources.

TABLE 2

UL-94 ratings for PEPA:melamine phosphate/Cloisite 15A formulations in polypropylene

| Example No. | PEPA:melamine Phosphate (%)** | Cloisite 15A (%) | Total Additive (%) | Wt. Ratio FR: organoclay | Avg. Burn Time(s) (Test 1) | Avg. Burn Time(s) (Test 2) | UL-94 Rating (Test 1) | UL-94 Rating (Test 2) |
|---|---|---|---|---|---|---|---|---|
| 1 | 21* | 0 | 21 | N/A | 0.8 | 0.4 | V-O | V-O |
| 2 | 20 | 1 | 21 | 20:1 | 0.2 | 0.2 | V-O | V-O |
| 3 | 19 | 0.4 | 19.4 | 47.5:1 | 2.5 | 1.3 | V-1 | V-1 |
| 4 | 19 | 0.8 | 19.8 | 23.75:1 | 1.1 | 0.7 | V-O | V-O |
| 5 | 19 | 1.0 | 20 | 19:1 | >30 | 3.2 | Fail | V-1 |
| 6 | 19 | 1.2 | 20.2 | 15.83:1 | 4.9 | >30 | V-1 | Fail |
| 7 | 19 | 1.6 | 20.6 | 11.88:1 | >30 | — | Fail | — |
| 8 | 19 | 2.0 | 21 | 9.5:1 | >30 | — | Fail | — |

*Minimum amount needed to obtain a V-O rating.
**Balance Propylene

TABLE 3

UL-94 ratings for PEPA:melamine phosphate/experimental organoclay formulations in polypropylene

| Example No. | PEPA: melamine phosphate** (%) | Exp. organ -oclay (%) | Total Additive (%) | Wt. Ratio FR: organoclay | Avg. Burn Time(s) (Test 1) | Avg. Burn Time(s) (Test 2) | UL-94 Rating (Test 1) | UL-94 Rating (Test 2) |
|---|---|---|---|---|---|---|---|---|
| 9 | 21* | 0 | 21 | N/A | 0.8 | 0.4 | V-O | V-O |
| 10 | 19 | 1 | 20 | 19:1 | 1.1 | 0.8 | V-O | V-O |
| 11 | 18 | 0.8 | 18.8 | 22.5:1 | 0.7 | 0.1 | V-O | V-O |
| 12 | 18 | 1 | 19 | 18:1 | 2.9 | 0.6 | V-1 | V-O |
| 13 | 18 | 1.2 | 19.2 | 15:1 | >30 | >30 | Fail | Fail |

*Minimum amount needed to obtain a V-O rating.
**Balance Polypropylene

TABLE 4

UL-94 ratings for PEPA:melamine phosphate/inorganic additive formulations in polypropylene

| Example No. | PEPA:melamine Phosphate* (%) | Inorganic Additive | Inorganic Additive (%) | Wt. Ratio FR: Inorganic additive | Total Additive (%) | Avg. Burn Time(s) | UL-94 Rating |
|---|---|---|---|---|---|---|---|
| 14 | 18 | Sodium Montmorillonite | 0.8 | 22.5:1 | 18.8 | 1.0 | V-O |
| 15 | 18 | OC Glass | 0.8 | 22.5:1 | 18.8 | >30 | Fail |
| 16 | 18 | TiO$_2$ | 0.8 | 22.5:1 | 18.8 | >30 | Fail |
| 17 | 18 | Talc | 0.8 | 22.5:1 | 18.8 | >30 | Fail |
| 18 | 18 | Kaolin Clay | 0.8 | 22.5:1 | 18.8 | >30 | Fail |

*Balance Polypropylene

EXAMPLES 19 THROUGH 28

In the following examples, additive compositions consisting of 48.5% pentaerythritol phosphate alcohol, 48.5% melamine phosphate, and 3% of one of sodium montmorillonite clay A, B or hectorite clay C were blended with polypropylene as noted above and fabricated into 1/16" test bars. Sodium montmorillonite clay A is available from Southern Clay, Inc., grade Cloisite Na. Sodium montmorillonite clay B had the characteristics shown in Table 5 whereas hectorite clay C is characterized as in Table 6.

TABLE 5

Sodium Montmorillonite Clay B

| | |
|---|---|
| General Description: | A specially processed, water-washed sodium montmorillonite clay. |
| Brightness (G.E.): | 83–87 |
| Viscosity: | 250–500 cps. (at 5% solids) |
| pH: | 2% dispersion 8.5–10.5 |
| Wet Particle Size: | Minimum 99.00% finer than 325 mesh (44 microns) |
| Elemental Analysis: | Typical values listed are not to be construed as rigid specifications |

(All metals are expressed as oxides, which are complexed in the mineral.)

| | |
|---|---|
| SiO$_2$ | 76.05% |
| Al$_2$O$_3$ | 16.10% |
| MgO | 1.47% |
| Fe$_2$O$_3$ | 1.68% |
| CaO | 1.86% |
| Na$_2$O | 1.33% |
| K$_2$O | 1.03% |
| LOI | 9.80% |

TABLE 6

Hectorite Clay C

| | |
|---|---|
| General Description: | High purity micronized sodium hectorite clay, consisting of microfine particles. |
| Brightness (G.E.): | 70 minimum |
| Viscosity: | 2500–5500 @ 5% solids |
| pH: | 2% dispersion 9.0–11.0 |
| Wet Particle Size: | Minimum 99.00% finer than 325 mesh (44 microns) |
| Elemental Analysis: | Trioctahedral smectite, a tri-layer expanding mineral structure: $M^+{}_{33}(Mg_{2.67}Li_{33})Si_4O_{10}(OH,F)_2 \cdot nH_2O$ M = Exchangeable cations: Na, Ca and Mg Typical values listed are not to be construed as rigid specifications. |

(All metals are expressed as oxides, which are complexed in the mineral.)

| | |
|---|---|
| SiO$_2$ | 61.78% |
| Al$_2$O$_3$ | 1.58% |
| MgO | 20.32% |
| Fe$_2$O$_3$ | 1.23% |
| CaO | 10.07% |
| Na$_2$O | 2.80% |
| K$_2$O | 0.33% |
| LOI | 9.50% |

TABLE 7

PP/Sodium Montmorillonite A (SMA)/
Pentaerythritol Phosphate Alcohol (PEPA)/
Melamine Phosphate (MEP) Compositions
FR = 3% SMA; 48.5% PEPA; 48.5% MEP

| Example | 19 | 20 | 21 | 22 |
|---|---|---|---|---|
| % Flame Retardant (FR) | None | 20 | 22 | 24 |
| UL-94 Data, 1/16" | | Double Gated | Double Gated | Double Gated |
| Total Burn Time, sec | >250 | 3 | 1 | 3 |
| UL-94 Rating, 1/16" | FAIL | V-O | V-O | V-O |
| IZOD IMPACT, ft.-lb/in | | | | |
| Notched, 1/8" | 1.0 | 0.8 | 0.7 | 0.7 |
| Standard Deviation | 0.1 | 0.04 | 0.03 | 0.04 |
| Unnotched, 1/8" | 30.7 | 11.0 | 9.2 | 8.6 |
| Standard Deviation | 0.9 | 0.7 | 0.6 | 0.7 |
| TENSILE STRENGTH, psi | 4720 | 4530 | 4370 | 4250 |
| TENSILE ELONGATION, % | 356.7[1] | 119.4 | 109.7 | 115.6 |
| St. Dev. % Elongation | 58.3 | 16.0 | 18.2 | 24.3 |
| FLEXURAL STRENGTH, psi | N/A | 7320 | 7130 | 7130 |
| FLEXURAL MODULUS, psi | N/A | 304000 | 310200 | 305100 |

[1] Four bars, out of ten, did not break (>450% elongation)

TABLE 8

PP/Sodium Montmorillonite B (SMB)/
Pentaerythritol Phosphate Alcohol (PEPA)/
Melamine Phosphate (MEP) Compositions
FR - 3% SMB; 48.5% PEPA; 48.5% MEP

| Example | 23 | 24 | 25 |
|---|---|---|---|
| % Flame Retardant (FR) | 20 | 22 | 24 |
| UL-94 Rating, 1/16" | V-O | V-O | V-O |
| IZOD IMPACT, ft.-lb/in | | | |
| Notched, 1/8" | 0.8 | 0.7 | 0.6 |
| Standard Deviation | 0.04 | 0.06 | 0.1 |
| Unnotched, 1/8" | 11.0 | 10.5 | 9.4 |
| Standard Deviation | 1.3 | 0.9 | 0.8 |
| TENSILE STRENGTH, psi | 4390 | 4250 | 4220 |
| TENSILE ELONGATION, % | 104.2 | 117.0 | 127.9 |
| St. Dev. % Elongation | 50.3 | 24.5 | 78.8 |
| FLEXURAL STRENGTH, psi | 6980 | 6920 | 6980 |
| FLEXURAL MODULUS, psi | 278100 | 279000 | 295800 |

TABLE 9

PP/Hectorite C (HC)
Pentaerythritol Phosphate Alcohol (PEPA)/
Melamine Phosphate (MEP) Compositions
FR - 3% HC; 48.5% PEPA; 48.5% MEP

| Example | 26 | 27 | 28 |
|---|---|---|---|
| % Flame Retardant (FR) | 20 | 22 | 24 |
| UL-94 Rating, 1/16" | V-O | V-O | V-O |
| IZOD IMPACT, ft.-lb/in | | | |
| Notched, 1/8" | 0.7 | 0.7 | 0.6 |
| Standard Deviation | 0.04 | 0.04 | 0.09 |
| Unnotched, 1/8" | 11.1 | 10.0 | 8.5 |
| Standard Deviation | 0.9 | 1.0 | 0.8 |
| TENSILE STRENGTH, psi | 4350 | 4410 | 4440 |
| TENSILE ELONGATION, % | 160.3 | 81.2 | 35.0 |
| St. Dev. % Elongation | 29.6 | 43.4 | 7.3 |
| FLEXURAL STRENGTH, psi | 7320 | 7090 | 7090 |
| FLEXURAL MODULUS, psi | 297800 | 290200 | 305200 |

EXAMPLES 29 THROUGH 35

The following examples illustrate the effectiveness of various ammonium polyphosphate-based (APP)FR/polypropylene compositions which were prepared and tested as above. The particular ammonium polyphosphate composition employed was a commercially available product which is believed mostly APP, but also contains other additives.

TABLE 10

Ammonium Polyphosphate (APP)FR/Polypropylene Compositions

| Example No. | 29 | 30 | 31 | 32 | 33 | 34 | 35 |
|---|---|---|---|---|---|---|---|
| FR-1 | APP | APP | APP | APP | APP | APP | APP |
| FR-2 | | | | | Sodium Montmorillonite Clay A | Sodium Montmorillonite Clay A | Sodium Montmorillonite Clay A |
| % FR-1 | 25 | 24 | 23 | 22 | 21 | 20 | 19 |

TABLE 10-continued

Ammonium Polyphosphate (APP)FR/Polypropylene Compositions

| Example No. | 29 | 30 | 31 | 32 | 33 | 34 | 35 |
|---|---|---|---|---|---|---|---|
| % FR-2 | | | | | 0.8 | 0.8 | 0.8 |
| % PP | 75 | 76 | 77 | 78 | 78.2 | 79.2 | 80.2 |
| UL-94 @1/16" | V-0 | V-0 | V-0 | FAIL | V-0 | V-0 | V-0 |

EXAMPLES 36 THROUGH 41

The following examples in Table 11 demonstrate the effect of zinc borate in a flame retardant polymer composition consisting of the indicated amount of polypropylene, flame retardant FRD which was 3% sodium montmorillonite clay B, 48.5% pentaerythritol phosphate alcohol and 48.5% melamine phosphate. The various compositions were prepared and rated as noted above.

TABLE 11

Zinc Borate/FRD/PP Compositions

| Example | 36 | 37 | 38 | 39 | 40 | 41 |
|---|---|---|---|---|---|---|
| % FRD | 16 | 16 | 18 | 18 | 17 | 18 |
| % ZnBorate | 0.1 | 0.5 | 0.1 | 0.5 | 0.3 | 0 |
| % PP | 83.9 | 83.5 | 81.9 | 81.5 | 82.7 | 82 |
| UL-94 Rating (V16") | FAIL | V-O | V-O | V-O | V-O | V-O/V-1/V-2 |

As will be appreciated from the foregoing, the montmorillonoid ionic phyllosilicate is typically included in amounts of from about 0.3 to about 1.5 weight percent based on the weight of the composition; whereas, from about 0.5 to about 0.7 is sometimes particularly preferred. The acid catalyst and nitrogen sources are typically present in amounts of less than about 25 percent by weight of the composition and preferably less than 18 weight percent in compositions characterized by a 94V-O rating.

The weight ratio of the acid catalyst source to the nitrogen source is in some embodiments from about 70:30 to about 30:70; or from about 60:40 to 40:60 in others. Weight ratios of acid catalyst source to nitrogen source of from about 45:55 to about 55:45 is particularly preferred in some embodiments.

Within the scope of the present invention are additive compositions for dispersion in a matrix polymer composition containing an acid source, a nitrogen source, an ionic phyllosilicate as described above, optionally a carbonific or char-promoting agent, and/or optionally a metal oxide or salt synergist as will be appreciated from the foregoing examples. In such compositions the ionic phyllosilicate is typically present in an amount of from about 0.5 to about 10 weight percent and the content of the acid and nitrogen sources correspond to like ranges in the polymer matrix upon blending with the matrix polymer composition in a ratio of about 1 part additive composition to about 4–5 parts of the polymer matrix composition.

While the invention has been described in detail in connection with numerous embodiments, modifications to the embodiments illustrated above within the spirit and scope of the present invention will be readily apparent to those of skill in the art.

What is claimed is:

1. An intumescent polymer composition comprising:
   (a) a matrix polyolefin composition;
   (b) an acid catalyst source;
   (c) a nitrogen source; and
   (d) a montmorrillonoid ionic phyllosilicate in an amount of from about 0.3 to about 1.5 weight percent of said composition, said ionic phyllosilicate having a cationic exchange capacity of at least about 5 meq per 100 g thereof and said ionic phyllosilicate being capable of synergizing the intumescence of said composition.

2. The intumescent composition according to claim 1, wherein said ionic phyllosilicate is a montmorillonoid ionic phyllosilicate.

3. The intumescent composition according to claim 2, wherein said montmorillonoid comprises a clay selected from the group consisting of montmorillonite and hectorite.

4. The intumescent composition according to claim 2, wherein said montmorillonoid ionic phyllosilicate is an organic montmorillonoid.

5. The intumescent composition according to claim 2 wherein said montmorillonoid is a sodium montmorillonite.

6. The intumescent composition according to claim 2, wherein said acid catalyst source is an organophosphorous compound.

7. The intumescent composition according to claim 2, wherein said nitrogen source is melamine or a salt thereof.

8. The intumescent composition according to claim 1, wherein said montmorillonoid ionic phyllosilicate is present in an amount of from about 0.5 to about 0.7 percent by weight of said composition.

9. The intumescent composition according to claim 1, wherein said matrix polyolefin composition consists essentially of polypropylene.

10. The intumescent composition according to claim 1, wherein said composition further comprises a metal oxide or metal salt.

11. The intumescent composition according to claim 10, wherein said composition comprises a metal salt and said salt is zinc borate.

12. The intumescent composition according to claim 2, wherein said acid source and said nitrogen source are present in a single chemical compound selected from the group consisting of: ammonium phosphate, ammonium polyphosphate, ammonium pyrophosphate and mixtures thereof.

13. An intumescent polyolefin composition comprising:
   (a) a polyolefin polymer composition;
   (b) a cyclic organophosphorous acid catalyst source;
   (c) a nitrogen source selected from the group consisting of amines, ureas, guanidines, guanamines, s-triazines, amino acids, salts thereof including phosphate, phosphonate, phosphinate, borate, cyanurate and sulfate salts, as well as mixtures of the foregoing; and (d) a montmorillonoid ionic phyllosilicate in an amount of from about 0.1 to about 2 weight percent.

14. The intumescent composition according to claim 13, wherein said cyclic organophosphorous acid catalyst source is a bicyclic organophosphorous compound and said nitrogen source comprises a component selected from the group consisting of: melamine, urea, benzoguanamine, ammeline, guanidine, cyanoguanidine and glycine; melamine phosphate, melamine pyrophosphate and melamine polyphosphate; ammonium phosphate, ammonium pyrophosphate and ammonium polyphosphate, ethylenediamine phosphate, melamine or ammonium cyanurate, melamine or ammonium borate and mixtures thereof.

15. The intumescent composition according to claim 14, wherein said bicyclic organophosphorous compound and said nitrogen source are present in an amount of from about 5 to about 25 weight percent in the aggregate.

16. The intumescent composition according to claim 15, further comprising a zinc or manganese salt as a co-synergist.

17. The intumescent composition according to claim 16, wherein said bicyclic organophosphorous compound and said nitrogen source are present in an amount of less than about 18 weight percent in the aggregate and said composition is characterized by a 94V-O flammability rating.

18. The intumescent composition according to claim 13, wherein said cyclic organophosphorous source comprises pentaerythritol phosphate alcohol.

19. The intumescent composition according to claim 13, wherein the weight ratio of said cyclic organophosphorous acid catalyst source to said nitrogen source is from about 70:30 to about 30:70.

20. The intumescent composition according to claim 19, wherein the weight ratio of said cyclic organophosphorous acid catalyst source to said nitrogen source is from about 60:40 to about 40:60.

21. The intumescent composition according to claim 20, wherein the weight ratio of said cyclic organophosphorous acid catalyst source to said nitrogen source is from about 45:55 to about 55:45.

22. The intumescent polypropylene composition according to claim 13, wherein said nitrogen source is melamine phosphate.

23. The intumescent composition according to claim 13, wherein said composition further comprises a metal oxide or metal salt.

* * * * *